May 3, 1949.   R. W. WALKER ET AL   2,469,022
COMPUTER FOR DETERMINING THE CORRECT PROPORTIONS
OF INGREDIENTS FOR SELECTED MIXTURES
Filed April 22, 1946   3 Sheets-Sheet 1

Inventors
R. W. Walker
W. G. Jamieson
By Glascock Downing Seebold
Attys.

Inventors
R. W. Walker
W. G. Jamieson
By Glascock Downing &c Attys

May 3, 1949.　　　R. W. WALKER ET AL　　　2,469,022
COMPUTER FOR DETERMINING THE CORRECT PROPORTIONS
OF INGREDIENTS FOR SELECTED MIXTURES
Filed April 22, 1946　　　　　　　　　　　　　3 Sheets-Sheet 3
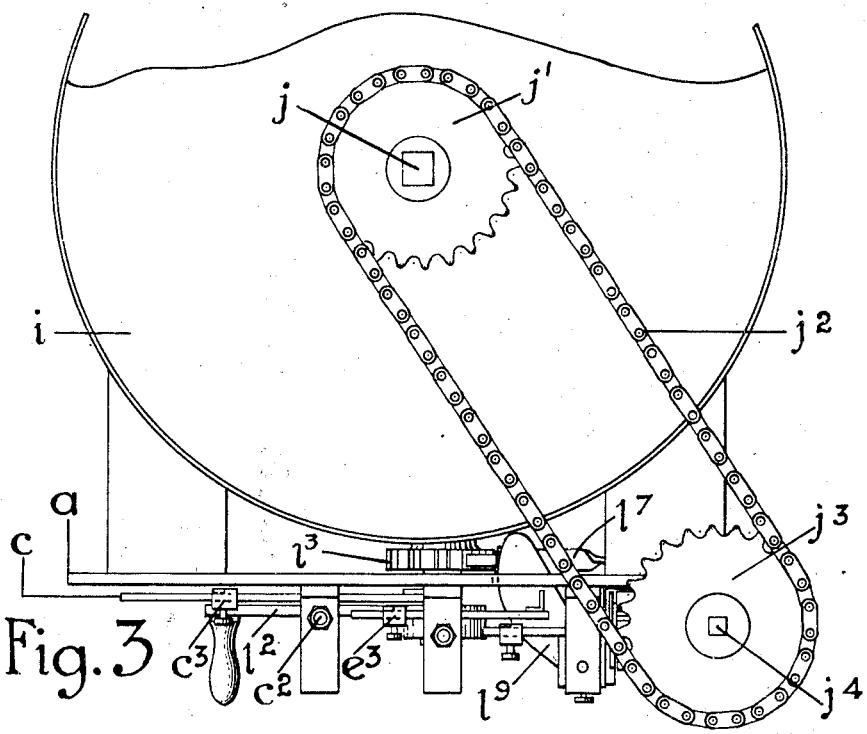
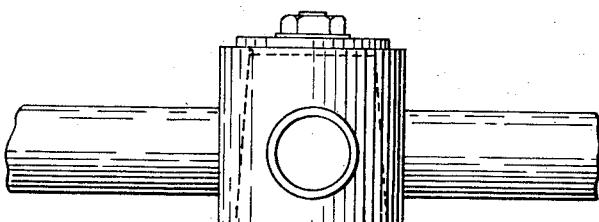
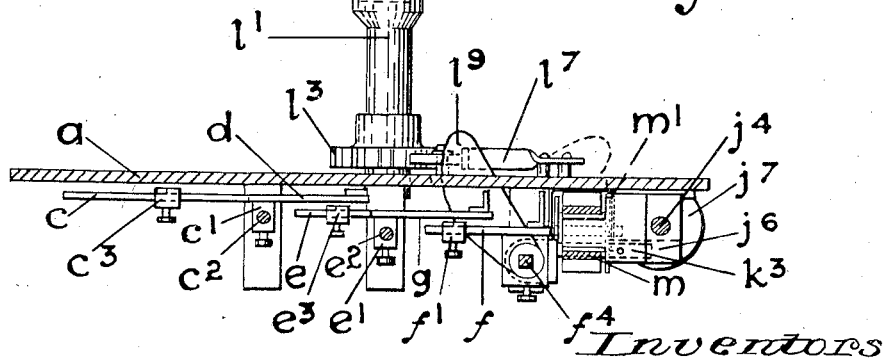
Inventors
R. W. Walker
W. G. Jamieson Patented May 3, 1949

2,469,022

UNITED STATES PATENT OFFICE 2,469,022

COMPUTER FOR DETERMINING THE CORRECT PROPORTIONS OF INGREDIENTS FOR A SELECTED MIXTURE

Ronald William Walker and William George Jamieson, Glasgow, Scotland

Application April 22, 1946, Serial No. 663,904
In Great Britain May 22, 1945

6 Claims. (Cl. 235—61)

This invention comprises an instrument for computing the amount of a substance to be added to one or more other ingredients of a mixture, at least one of the ingredients having a variable affecting the amount of the substance to be added.

In the manufacture of concrete, for example, the quality of the concrete depends to a large extent upon the relative quantities of water and cement. Consistent with workability the less water used the stronger the resultant concrete. The total water in the product compared with total cement in the product is known as the water cement ratio. In practice this water cement ratio is varied according to the type of concrete desired. Further, it is generally accepted that the water cement ratio decided upon should be rigidly adhered to throughout any particular work.

A factor to be taken into consideration in computing the amount of water to be added is the water content already present as moisture in one or more of the ingredients constituting the aggregate. Thus the sand or fine aggregate has a certain water content which is variable and likewise the stone or coarse aggregate.

One object of the present invention is to provide an instrument by which is computed the water to be added, when using aggregates having a variable moisture content, in order to conform to any specification defining the total quantity of water in the product.

The invention is however applicable to other purposes wherein a substance is to be added to one or more ingredients, at least one of which contains a variable affecting the amount of the substance to be added.

The invention will now be described with reference to the annexed drawings wherein:

Figure 3 is a plan view of Figure 2, part of the tank being shown broken away and Figure 4 is a section on the line 4—4, Figure 2, with tank removed, and the operating handle omitted.

In the drawings like reference letters denote the same or corresponding parts.

Figure 1:
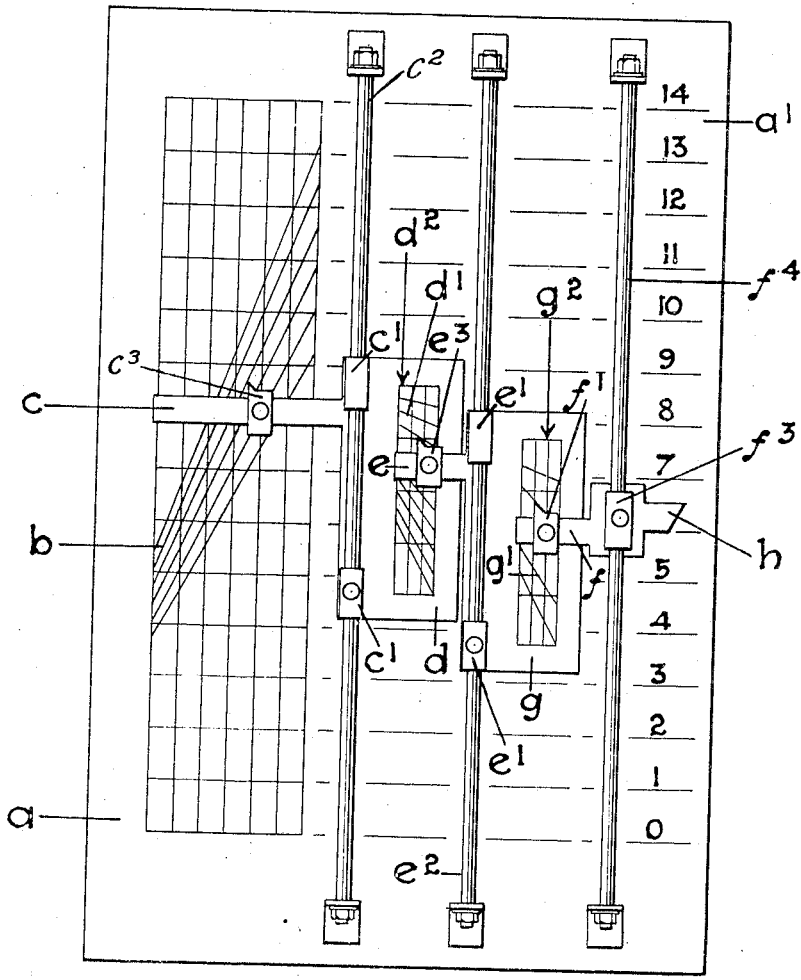
Figure 1 is an elevation of one form of instrument in accordance with the invention.

The instrument illustrated in Figure 1 will now be described, by way of example, as applied to computing the amount of water to be added to an aggregate in the making of concrete.

In describing the instrument it will be assumed that the ingredients are given in pounds weight for the solids and gallons for water and that the concrete is produced in batches.

The invention is however applicable to continuous process of production wherein the quantity of water is proportioned to the rate of production.

The instrument embodies a plate $a$ on which is marked or mounted a scale $a^1$ marked off in gallons. Mounted or engraved on said plate is a series of graphs $b$ from which can be read off the total amount of water required under various values of the water-cement ratio in relation to the amount of cement required per batch of concrete.

An arm $c$ is slidably and fixably carried by sleeves $c^1$ mounted on a rod $c^2$ extending over the face of the plate and on said arm is an adjustable cursor $c^3$, said arm extending at right angles to the rod.

To ascertain the total amount of water required by the water cement ratio in use, the cursor $c^3$ is moved along the arm $c$ and fixed in the position called for by the amount of cement to be used in the batch. The sleeves $c^1$ are then moved on the rod until the reading point of the cursor $c^3$ coincides with the graph, or is interpolated between adjacent graphs, depicting the desired water-cement ratio. The reading point of said cursor will then be in a position which shows in gallons the total water required by the water-cement ratio and the amount of cement in use.

The said sleeves carry a plate $d$ on which is mounted or engraved a series of graphs $d^1$ relating various amounts of sand and percentage moisture content with a scale of gallons, so that the number of gallons of water contained in a known amount of sand having given percentage of moisture in it will be read off directly.

The zero $d^2$ of the graphs indicating moisture content of the sand coincides in horizontal relationship with the reading point of the said cursor $c^3$.

A further arm $e$ is carried by sleeves $e^1$ slidably and fixably mounted on a second rod $e^2$ parallel to the first, and said arm has an adjustable cursor $e^3$ which can be clamped in any adjusted position.

To ascertain the water content of the sand the second cursor $e^3$ is moved along its arm to coincide with the figure showing the amount of sand to be used per batch of concrete and then clamped in position. The sleeves $e^1$ with said arm $e$ and cursor $e^3$ are then moved until the cursor point coincides with the moisture content graph, interpolated as may be necessary, corresponding with the moisture percentage already determined independently, and clamped in position.

The reading point of the second cursor $e^3$ will then give directly on the gallons scale of the graph the number of gallons of water corresponding to the weight of sand and moisture content setting. The reading point of the second cursor $e^3$ compared with that of the cursor $c^3$ shows a deduction from the amount indicated by the latter equal to the gallons of water contained as moisture in the sand.

Water as moisture in the coarse aggregate is dealt with by a third arm $f$ and cursor $f^1$ carried by sleeve $f^3$ slidable on a third rod $f^4$ parallel to the other two in conjunction with a plate $g$ on which graphs $g^1$ are marked or engraved, which plate is carried by the sleeves $e^1$ which carries the second arm $e$. The zero $g^2$ of the third graphs is in line with the reading point of the aforesaid second cursor $e^3$. Said graphs are such that having ascertained the moisture content as a percentage of the weight of stone required per batch, the amount of water in gallons contained in the stone is deducted from that remaining from the total requirement after deducting that contained in the sand.

The third sleeve carries a pointer $h$ in line with the reading point of said third cursor $f^1$ and which pointer indicates on the aforesaid scale the amount of water to be measured off and added to the batch to make up the difference between total water required and that in the sand and stone.

In addition to or in lieu of the scale $a^1$ a gauge glass, suitably graduated may be provided, said glass being connected, or adapted to be connected to any suitable device for use in the measurement of water to be added to the batch of concrete.

It will be apparent that the instrument may be so constructed that the quantities obtained by the adjustment of the cursors $e^3$ and $f^1$, or either of them, may be added to that obtained by the adjustment of cursor $c^3$.

In lieu of, or in addition to indicating the water to be added the third or last arm may co-operate with means for measuring or delivering the desired quantity of water, and such combination will now be described by way of example with reference to Figures 2, 3 and 4.

The instrument by which is indicated the amount of water to be added is similar to that shown in Figure 1 and need not be further described.

Figure 2:
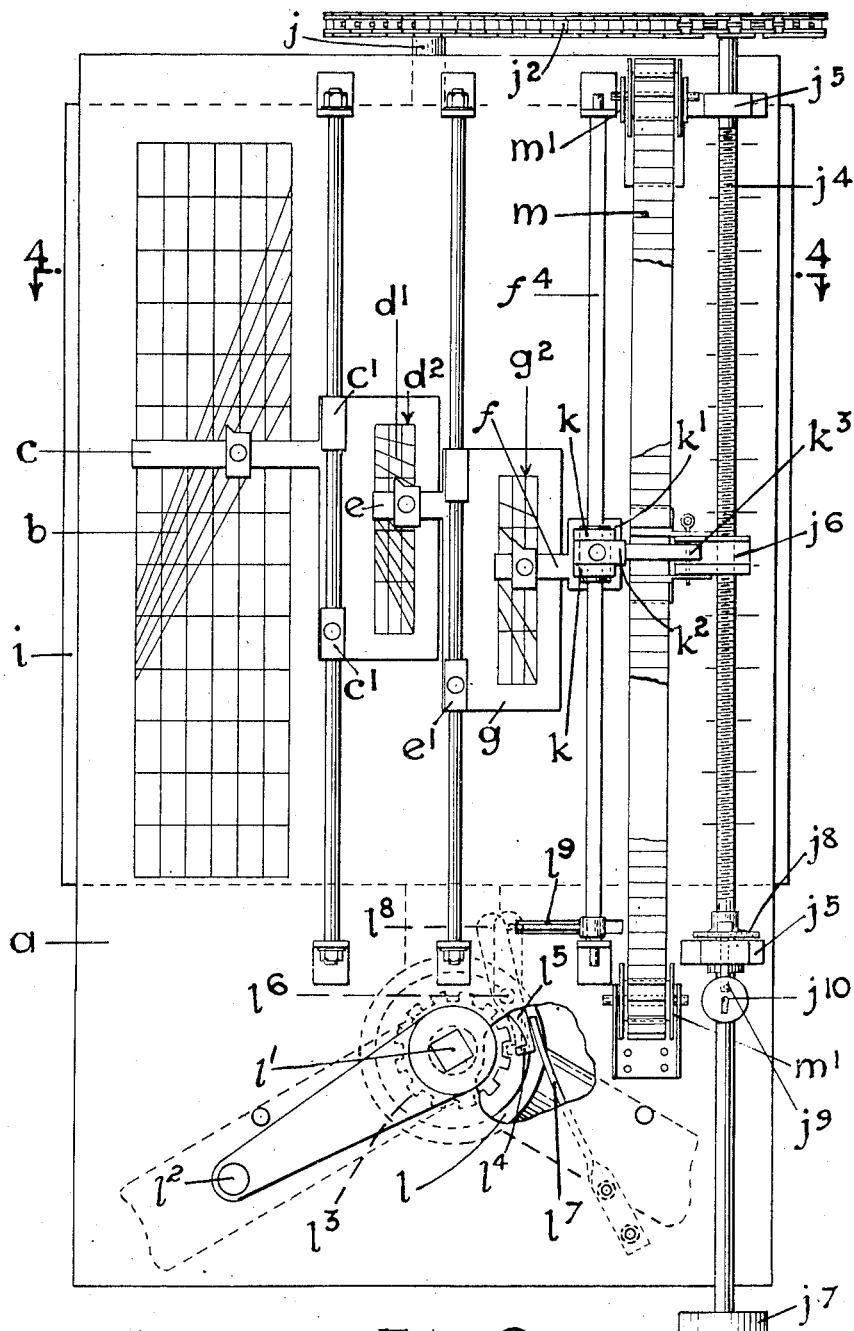
Figure 2 is an elevation of an instrument in accordance with the invention in combination with a tank having a cock which can be operated only when the capacity of the tank is adjusted in accordance with the final reading of the indicator.

As shown in said Figures 2, 3 and 4, the plate $a$ is secured to a tank $i$ and may carry a gauge glass, not shown, connected to said tank and graduated to show the volume of the contents of the tank at various levels.

The capacity of the tank is governed by means of a float or piston, not shown, mounted on a screw threaded spindle $j$ to the upper end of which is secured a sprocket wheel $j^1$. The latter is connected by means of a chain $j^2$ with a second sprocket wheel $j^3$ fast on a vertical screw threaded rod $j^4$ carried by brackets $j^5$ secured to the plate $a$. Threaded on the rod $j^4$ is a block $j^6$ which is incapable of rotation on said rod but can partake of an axial movement thereon.

The rod is provided with a knurled head $j^7$ so that it can be rotated to raise and lower the block. Further the rod is provided with a flange $j^8$ having a series of circumferential holes, a pin $j^9$ inserted through one of the holes in the flange and a hole in the adjacent bracket $j^5$ locks the rod against further rotation after adjustment. Pin $j^9$ is adapted to receive a padlock $j^{10}$ preventing its unauthorised withdrawal. By turning the knurled head $j^7$ the float can be adjusted to control the capacity of the tank and the block will move axially on its rod to assume a position corresponding to the adjusted capacity.

In this construction the rod $f^4$ is of square or equivalent cross section and passes through lugs $k$ which project from a plate $k^1$ carried by the arm $f$. Between said lugs and secured to the rod $f^4$ so as to be capable of axial movement thereon but incapable of a rotary movement relative thereto is a boss $k^2$ carrying an arm $k^3$. This arm is adapted to fit in a recess in the block $j^6$.

At the foot of the tank is an inlet and discharge cock $l$ the spindle $l^1$ of the cock plug having fast thereon and a hand lever $l^2$ and a notched plate $l^3$. Arranged to engage with said notched plate is a catch $l^4$ on the end of an arm $l^5$ pivoted at $l^6$ and loaded by a leaf spring $l^7$ secured to the back of the plate $a$. Said arm is provided with an upward extension $l^8$ with which is arranged to co-operate a cam $l^9$ fast on the lower end of the rod $f^4$ of square or equivalent section.

Assume the indicator has been set as above described in accordance with the volume of water which has to be added. The knurled head $j^7$ is then rotated to raise or lower the block $j^6$, as the case may be, until the upper edge of the block is in alignment with the reading point of the cursor $f^1$. The arm $k^3$ is then rotated in a horizontal plane so that it fits into the recess in the block $j^6$. A locking pin may be provided to lock the arm in its recess and tampering with the adjustment is prevented by inserting pin $j^9$ through a hole in the flange $j^8$ and through the bracket adjacent thereto and padlocking the pin. One hole in the flange will be in a position, or nearly so, to receive the pin.

The capacity of the tank, when the arm fits into the recess, is adjusted to correspond to the volume of water required to be added as determined by the indicator.

When the rod $f^4$ is rotated as aforesaid, the cam $l^9$ co-operates with the extension $l^8$ of the arm $l^5$ thereby rocking the latter about its pivot and withdrawing the catch $l^4$ from the notched plate $l^3$. The cock is now free to be operated to charge and discharge the adjusted capacity of the tank. Prior to the arm being so rotated it will be apparent that the engagement of the catch with the toothed plate will prevent the operation of the cock.

In order to ensure that the arm can be so rotated only when the capacity of the tank is set in accordance with the position of said arm $k^3$ a flexible belt $m$ is secured to the block $j^6$ and passes over pulleys $m^1$ the belt preventing the movement of the arm $k^3$ sufficiently far to enable the cam to withdraw the catch if the capacity of the tank is not in accordance with the position of the arm $k^3$. When the capacity of the tank and the position of said arm are corresponding the arm fits into the recess in block $j^6$, thus permitting the cam to withdraw the catch.

The instrument may take other forms. For example the graphs may be carried by drums.

Further, the graphs or scales may be varied as found desirable for any particular end in view.

Also the invention may be used for computing any other substance, solid, granular or powdered, to be added or deducted to one or more ingredients at least one of which has a variable affecting the amount of the substance to be added, and/or controlling the setting of mechanism governing the amount of the substance to be added.

We claim:

1. An instrument for the purpose set forth comprising an indicator in the form of a series of graphs denoting the amount of a substance which must be added to various quantities of an ingredient in order to meet various specific requirements, a movable member to register with said indicator, a second indicator which moves with said movable member and which is in the form of a series of graphs denoting the alteration in the quantity of the substance to be added by virtue of the addition of the first ingredient of various amounts and qualities of a second ingredient and a second movable member to register with the second indicator and which, by its position, determines the amount of the substance indicated by the setting of the first movable member and altered by the setting of the second movable member, the amount so determined being that which must be added to the combined quantities of the first and second ingredient in order to meet a specific requirement.

2. An instrument for the purpose set forth comprising an indicator in the form of a series of graphs denoting the amount of a substance which must be added to various quantities of an ingredient in order to meet various specific requirements, a movable member to register with said indicator, a second indicator which moves with said movable member and which is in the form of a series of graphs denoting the alteration in the quantity of the substance to be added by virtue of the addition to the first ingredient of various amounts and qualities of a second ingredient, a second movable member to register with the second indicator and which, by its position, determines the amount of the substance indicated by the setting of the first movable member and altered by the setting of the second movable member, a third indicator which moves with the second movable member and which is likewise in the form of a series of graphs denoting the alteration of the quantity of the substance to be added by virtue of the addition to the first ingredient of various amounts and qualities of a third ingredient and a third movable member to register with the third indicator and which by its position determines the amount of the substance indicated by the setting of the first indicator and altered by the setting of the second and third movable members, the amount so determined being that which must be added to the combined quantities of the ingredients in order to meet a specific requirement.

3. An instrument for the purpose set forth comprising an indicator in the form of a series of graphs denoting the amount of a substance which must be added to various quantities of an ingredient in order to meet various specific requirements, a movable member to register with said indicator, a second indicator which moves with said movable member and which is in the form of a series of graphs denoting the alteration in the quantity of the substance to be added by virtue of the addition to the first ingredient of various amounts and qualities of a second ingredient, a second movable member to register with the second indicator and a graduated scale on which is indicated by the position of the second movable member the amount of the substance indicated by the setting of the first movable member and altered by the setting of the second movable member, the amount so determined being that which must be added to the combined quantities of the first and second ingredients in order to meet a specific requirement.

4. An instrument for the purpose set forth comprising an indicator in the form of a series of graphs denoting the amount of a substance which must be added to various quantities of an ingredient in order to meet various specific requirements, a moveable member to register with said indicator, a second indicator which moves with said moveable member and which is in the form of a series of graphs denoting the alteration of the quantity of the substance to be added by virtue of the addition to the first ingredient of various amounts and qualities of a second ingredient, a second moveable member to register with the second indicator, means for delivering a measured quantity of the substance said means being controlled by the position of the second moveable member and operating to measure off the quantity of the substance indicated by the setting of the first moveable member and altered by the setting of the second moveable member, the amount measured off being that which must be added to the combined quantities of the first and second ingredients in order to meet a specific requirement.

5. An instrument for the purpose set forth comprising an indicator in the form of a series of graphs denoting the amount of a substance which must be added to various quantities of an ingredient in order to meet various specific requirements, a moveable member to register with said indicator, a second indicator which moves with said moveable member and which is in the form of a series of graphs denoting the alteration of the quantity of the substance to be added by virtue of the addition to the first ingredient of various amounts and qualities of a second ingredient, a second moveable member to register with the second indicator and which, by its position, determines the amount of the substance indicated by the setting of the first moveable member and altered by the setting of the second moveable member, the amount so determined being that which must be added to the combined quantities of the first and second ingredients in order to meet a specific requirement, a tank, means for adjusting the effective capacity of the tank, a cock controlling the inlet and discharge of the substance to and from said tank, and means whereby said cock can be operated only when the instrument and the effective capacity of the tank are adjusted to correspond.

6. An instrument for the purpose set forth comprising an indicator in the form of a series of graphs denoting the amount of a substance which must be added to various quantities of an ingredient in order to meet various specific requirements, a moveable member to register with said indicator, a second indicator which moves with said moveable member and which is in the form of a series of graphs denoting the alteration in the quantity of the substance to be added by virtue of the addition to the first ingredient of various amounts and qualities of a second ingredient, a second moveable member to register with the second indicator and which, by the position, determines the amount of the substance indicated by the setting of the first moveable member and altered by the setting of the second moveable member, a third indicator which moves with the second moveable member and which is likewise in the form of a series of graphs denoting the alteration of the quantity of the substance to be added by virtue of the addition to the first ingredient of various amounts and qualities of a third ingredient, a third moveable member to register with the third indicator and which by its position determines the amount of the substance indicated by the setting of the first indicator and altered by the setting of the second and third moveable members and a graduated scale on which is indicated by the position of the third moveable member the amount of the substance as shown by the position of the said member which must be added to the ingredients to meet a specific requirement.

RONALD WILLIAM WALKER.
WILLIAM GEORGE JAMIESON.

REFERENCES CITED

The following references are of record in the file of this patent:

UNITED STATES PATENTS

| Number | Name | Date |
| --- | --- | --- |
| 1,488,190 | Block | Mar. 25, 1924 |
| 1,825,659 | Goetzenberger | Oct. 6, 1931 |
| 1,923,082 | Ely | Aug. 22, 1933 |